(12) United States Patent
Rajan et al.

(10) Patent No.: US 8,051,478 B1
(45) Date of Patent: Nov. 1, 2011

(54) SECURE BROWSER

(75) Inventors: Archana S. Rajan, Santa Monica, CA (US); Edward Bonver, Encino, CA (US); Mark Kennedy, Redondo Beach, CA (US)

(73) Assignee: Symantec Corporation, Cupetino, CA (US)

( * ) Notice: Subject to any disclaimer, the term of this patent is extended or adjusted under 35 U.S.C. 154(b) by 1434 days.

(21) Appl. No.: 11/268,015

(22) Filed: Nov. 7, 2005

(51) Int. Cl.
*G06F 12/14* (2006.01)
*G06F 12/16* (2006.01)

(52) U.S. Cl. .................. 726/22; 726/24; 726/25

(58) Field of Classification Search .......... None
See application file for complete search history.

(56) References Cited

U.S. PATENT DOCUMENTS

| | | | |
|---|---|---|---|
| 5,892,904 A * | 4/1999 | Atkinson et al. ........... | 726/22 |
| 6,088,803 A | 7/2000 | Tso et al. | |
| 6,314,409 B2 | 11/2001 | Schneck | |
| 6,928,553 B2 | 8/2005 | Xiong et al. | |
| 2002/0083343 A1 | 6/2002 | Crosbie | |
| 2002/0087882 A1 | 7/2002 | Schneier et al. | |
| 2002/0157020 A1 | 10/2002 | Royer | |
| 2002/0186255 A1* | 12/2002 | Shafron et al. ............ | 345/810 |
| 2003/0028655 A1* | 2/2003 | Owhadi ................... | 709/229 |
| 2003/0037251 A1 | 2/2003 | Frieder et al. | |
| 2003/0051026 A1 | 3/2003 | Carter | |

FOREIGN PATENT DOCUMENTS

WO    WO 01/71499 A1    9/2001

OTHER PUBLICATIONS

Lee, Sin Yeung; Low, Wai Lup and Wong, Pei Yuen, "Learning Fingerprints for a Database Intrusion Detection System", Computer Security Laboratory, DSO National Labortories, Singapore, ESORICS Nov. 2002, LNCS 2502, pp. 264-279.

Low, Wai Lup, et al., "DIDAFIT: Detecting Intrusions in Databases Through Fingerprinting Transactions," ICEIS 2002, Fourth International Conference on Enterprise Information Systems, vol. 1, Apr. 3-6, 2002, pp. 121-128, Ciudad Real, Spain.

Change log for Analysis Console for Intrusion Detection (Acid), indicating release date of Sep. 8, 2000 [online]. Andrew.cmu.edu [retrieved Apr. 18, 2003]. Retrieved from the Internet: <URL: http://www.andrew.cmu.edu/~rdanyliw/snort/CHANGELOG>, U.S.A.

AirCERT web page, last updated Sep. 18, 2000 [online]. Cert.org [retrieved Apr. 18, 2003]. Retrieved from the Internet: <URL: http://www.cert.org/kb/aircert/>, U.S.A.

(Continued)

*Primary Examiner* — Benjamin Lanier
(74) *Attorney, Agent, or Firm* — Fenwick & West LLP

(57) ABSTRACT

A secure browsing manager intercepts load calls, and determines whether intercepted load calls are attempting to load code into the browser. When the secure browsing manager detects that a load call is attempting to load code into the browser, it determines whether that code is trusted. The secure browsing manager processes the attempt to load the code into the browser according to whether or not the code is trusted. If the secure browsing manager determines that the code is trusted, it allows the code to be loaded into the browser, thereby securely allowing the benefits of loaded code. If the secure browsing manager determines that the code is not trusted, it blocks the attempt to load the code into the browser, or alternatively takes other actions, such as allowing the code to be loaded into the browser, but blocking certain user initiated activity.

12 Claims, 4 Drawing Sheets

OTHER PUBLICATIONS

Analysis Console for Intrusion Detection (ACID) web page [online]. Andrew.cmu.edu [retrieved Apr. 18, 2003]. Retrieved from the Internet: <URL: http://www.andrew.cmu.edu/~rdanyliw/snort/snortacid.html>, U.S.A.

Schneier, Bruce, Managed Security Monitoring: Network Security for the 21st Century, 2001 [online]. Counterpane.com [retrieved Apr. 18, 2003]. Retrieved from the Internet: <URL: http://www.counterpane.com/msm.pdf>, U.S.A.

Web page, announcing Nov. 11, 2000 release of Dshield [online]. Deja.com [retrieved Apr. 18, 2003]. Retrieved from the Internet: >URL: http://groups.google.com/groups?selm=8vm48v%245pd% 241%40nnrp1.deja.com &oe=UTF-8&output=gplain>, U.S.A.

e=Security, Inc., Correlation Technology for Security Event Management, Oct. 7, 2002 [online]. eSecurityins.com [retrieved Apr. 18, 2003]. Retrieved from the Internet: <URL: http://www.esecurityinc.com/downloads/Correlation_WP.pdf>, Vienna, VA.

MyNetWatchman.com web pages indicating Sep. 2000 beta release [online]. MyNetWatchman.com [retrieved Apr. 18, 2003]. Retrieved from the Internet: <URL: http://www.mynetwatchman.com/mynetwatchman/relnotes.htm>, Alpharetta, GA.

2000 Review of eSecurity product on Network Security web page [online]. SCMagazine.com [retrieved Apr. 18, 2003]. Retrieved from the Internet: <URL: http://www.scmagazine.com/scmagazine/2000_12/testc/network.htm#Open>.

"Caltarian Security Technology Platform", Riptech web pages [online]. Symantec.com [retrieved Apr. 18, 2003]. Retrieved from the Internet: <URL: http://enterprisesecurity.symantec.com/Content/displayPDF.cfm?SSSPDFID=35&EID=O>, U.S.A.

Slashdot.org web pages describing Dshield, dated Nov. 27, 2000 [online]. Slashdot.org [retrieved Apr. 18, 2003]. Retrieved from the Internet: <URL: http://slashdot.org/article.pl?sid=00/11/27/1957238&mode=thread>, U.S.A.

Chung, C., Gertz, M., and Levitt, K., "DEMIDS: A Misuse Detection System for Database Systems," Department of Computer Science, University of California at Davis, Oct. 1, 1999, pp. 1-18.

SCIP Product, Microdasys—"The need to control, inspect and manage encrypted webtraffic." [online]. Retrieved on Mar. 18, 2005. Retrieved from the Internet: <URL: http://www.microdasys.com/scipproduct+M54a708de802.html>. Author unknown, 2 pages, Czech Republic.

Microdasys, "S C I P Secured Content Inspection: Protecting the Enterprise from CryptoHacks," 2003 by Microdasys Inc., 2 pages, Czech Republic.

Marketing, "Digital Certificates—Best Practices—A Microdasys Whitepaper," bestpractice.doc, Revision 1.1 (Jul. 31, 2003), 6 pages, Czech Republic.

Network Computing Solutions—"Microdasys SCIP" [online]. Retrieved on Mar. 18, 2005. Retrieved from the Internet: <URL: http://www.ncs/cz/index.php?language=en&menuitem-4 &subitem=13>, 2 pages, Czech Republic.

Network Computing Solutions—NSC Homepage—News [online]. Retrieved on Mar. 18, 2005. Retrieved from the Internet: <URL: http://www.nsc.cz/index.php?language=en&menuitem=0 &subitem=4&subitem=13>, 3 pages, Czech Republic.

"SSL Stripper Installation Guide," [online]. Retrieved in Mar. 2005 from the Internet: <URL: http://www.sslstrippercom>, 2 pages, U.S.A.

SSL Stripper Home Page, "Security Solutions: SSL Stripper," [online]. Retrieved on Mar. 18, 2005. Retrieved from the Internet: <URL: http://www.vroyer.org/sslstripper/index.html>, 2 pages, Oct. 15, 2004, U.S.A.

SSL Stripper Sample Screenshots, "Security Solutions: Sample Screenshots," [online]. Retrieved on Mar. 18, 2005. Retrieved from the Internet: <URL: http://www.vroyer.org/sslstripper/screenshots.html>, 3 pages, Oct. 15, 2004, U.S.A.

Webwasher AG/Full feature set, "Full feature set," [online]. Retrieved on Mar. 18, 2005. Retrieved from the Internet: <URL: http://www.webwasher.com/enterprise/products/webwasher_products/ssl_scanner/full_feature_set..html?l...>, 2 pages.

Webwasher AG/Webwasher 1000 CSM Appliance, "Webwasher 1000 CSM Appliance," [online]. Retrieved on Mar. 18, 2005. Retrieved from the Internet: <URL: http://www.webwasher.com/enterprise/products/webwasher_products/csm_appliance/index...> 2 pages.

Webwasher AG/Webwasher URL Filter, "Webwasher URL Filter," [online]. Retrieved on Mar. 18, 2005. Retrieved from the Internet: <URL: http://www.webwasher.com/enterprise/products/webwasher_products/webwasher_url_filter..> 1 page.

Webwasher AG/Webwasher Anti Virus, "Webwasher Anti Virus," [online]. Retrieved on Mar. 18, 2005. Retrieved from the Internet: <URL: http://www.webwasher.com/enterprise/products/webwasher_products/anti_virus/index.html...>, 2 pages.

Webwasher AG/Webwasher Anti Spam, "Webwasher Anti Spam," [online]. Retrieved on Mar. 18, 2005. Retrieved from the Internet: <URL: http://www.webwasher.com/enterprise/products/webwasher_products/anti_spam/index.htm...>, 1 page.

Webwasher AG/Webwasher Content Protection, "Webwasher Content Protection," [online]. Retrieved on Mar. 18, 2005. Retrieved from the Internet: <URL: http://www.webwasher.com/enterprise/products/webwasher_products/content_protection/index.html>, 2 pages.

Webwasher AG/Webwasher SSL Scanner, "Webwasher SSL Scanner," [online]. Retrieved on Mar. 18, 2005. Retrieved from the Internet: <URL: http://www.webwasher.com/enterprise/products/webwasher_products/ssl_scanner/index.html>, 2 pages.

CyberGuard Corporation, "CyberGuard and Webwasher: The Value Proposition," A CyberGuard Corporation White Paper, May 2004, 6 pages.

* cited by examiner

SECURE BROWSER

TECHNICAL FIELD

This invention pertains generally to computer security, and more specifically to securing a browser.

BACKGROUND

Various browsers support the loading of third party code into the browser to add additional functionality and customize the browsing experience. For example, Microsoft's Internet Explorer® supports Browser Helper Objects (BHOs), which are specialized dynamic link libraries that supplement and customize the browsing functionality.

While code loaded into a browser such as a BHO can be used constructively, such code can also be used maliciously, for example as a vehicle for crimeware. Since BHOs and the like are loaded as part of the browser, they have complete access to the contents of the browser, and thus can access confidential information transmitted to web sites, such as passwords, credit card numbers, social security numbers, etc.

What is needed are methods, systems and computer readable media for allowing only trusted code to be loaded into a browser, thereby allowing the benefits of loaded third party code without compromising security.

SUMMARY OF INVENTION

Computer-implemented methods, computer systems and computer-readable media provide a secure browser. A secure browsing manager intercepts load calls, and determines whether intercepted load calls are attempting to load code into the browser. When the secure browsing manager detects that a load call is attempting to load code into the browser, the secure browsing manager determines whether that code is trusted. The secure browsing manager proceeds to process the attempt to load the code into the browser according to whether or not the code is trusted. If the secure browsing manager determines that the code is trusted, it allows the code to be loaded into the browser, thereby securely allowing the benefits of loaded, third party code. On the other hand, if the secure browsing manager determines that the code is not trusted, it blocks the attempt to load the code into the browser, thereby keeping the browser secure. In other embodiments, the secure browsing manager takes other actions, such as allowing the code to be loaded into the browser, but blocking certain user initiated activity.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
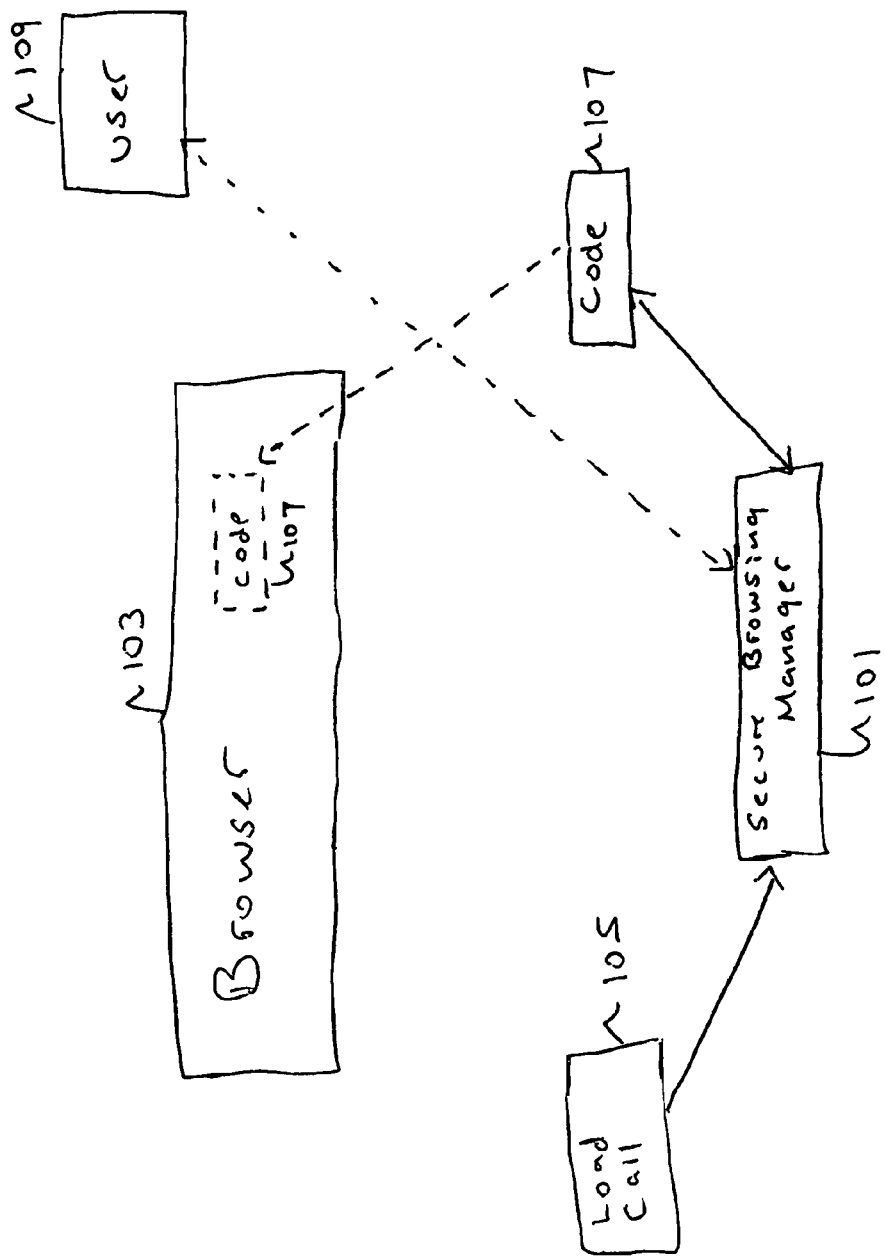
FIG. 1 is a block diagram illustrating a high level overview of a secure browsing manager providing a secure browser, according to some embodiments of the present invention.

FIG. 1 illustrates a secure browsing manager 101 providing a secure browser 103, according to some embodiments of the present invention. It is to be understood that although the secure browsing manager 101 is illustrated as a single entity, as the term is used herein a secure browsing manager 101 refers to a collection of functionalities which can be implemented as software, hardware, firmware or any combination of these. Where a secure browsing manager 101 is implemented as software, it can be implemented as a standalone program, but can also be implemented in other ways, for example as part of a larger program, as a plurality of separate programs, as a kernel loadable module, as one or more device drivers or as one or more statically or dynamically linked libraries. The software can be represented as program code forming a computer program product. The computer program product can be contained by a non-transitory computer-readable storage medium such as a hard disk, compact disk (CD), DVD, or solid state memory device.

As illustrated in FIG. 1, the secure browsing manager 101 intercepts load calls 105, and determines whether intercepted load calls 105 are attempting to load code 107 into the browser 103. The implementation mechanics of intercepting load calls 105 and of determining whether intercepted load calls 105 are attempting to load code 107 into the browser 103 are known to those of ordinary skill in the art of computer operating system internals, and their use within the context of the present invention will be readily apparent to those so skilled in light of this specification. Additionally, some examples are discussed in greater detail below in conjunction with the description of FIG. 4.

It is to be understood that various types of code 107 can be loaded into browsers 103, such as Browser Helper Objects, other dynamic link libraries, Active-X controls, Java applets, global Windows hooks and toolbars. Of course, the present invention is not tied to any specific type of loadable code 107, nor to any specific browser 103.

When the secure browsing manager 101 detects that a load call 105 is attempting to load code 107 into the browser 103, the secure browsing manager 101 determines whether that code 107 is trusted. It is to be understood that the criteria used to determine whether code 107 is trusted is a variable design parameter, which can be a function of factors such as whether the code 107 is known, the context of the specific browser 103 user 109, and/or the current user 109 or system environment.

The secure browsing manager 101 proceeds to process the attempt to load the code 107 into the browser 103 according to whether or not the code 107 is trusted. If the secure browsing manager 101 determines that the code 107 is trusted, it allows the code 107 to be loaded into the browser 103, thereby securely allowing the benefits of loaded, third party code 107.

Figure 2:
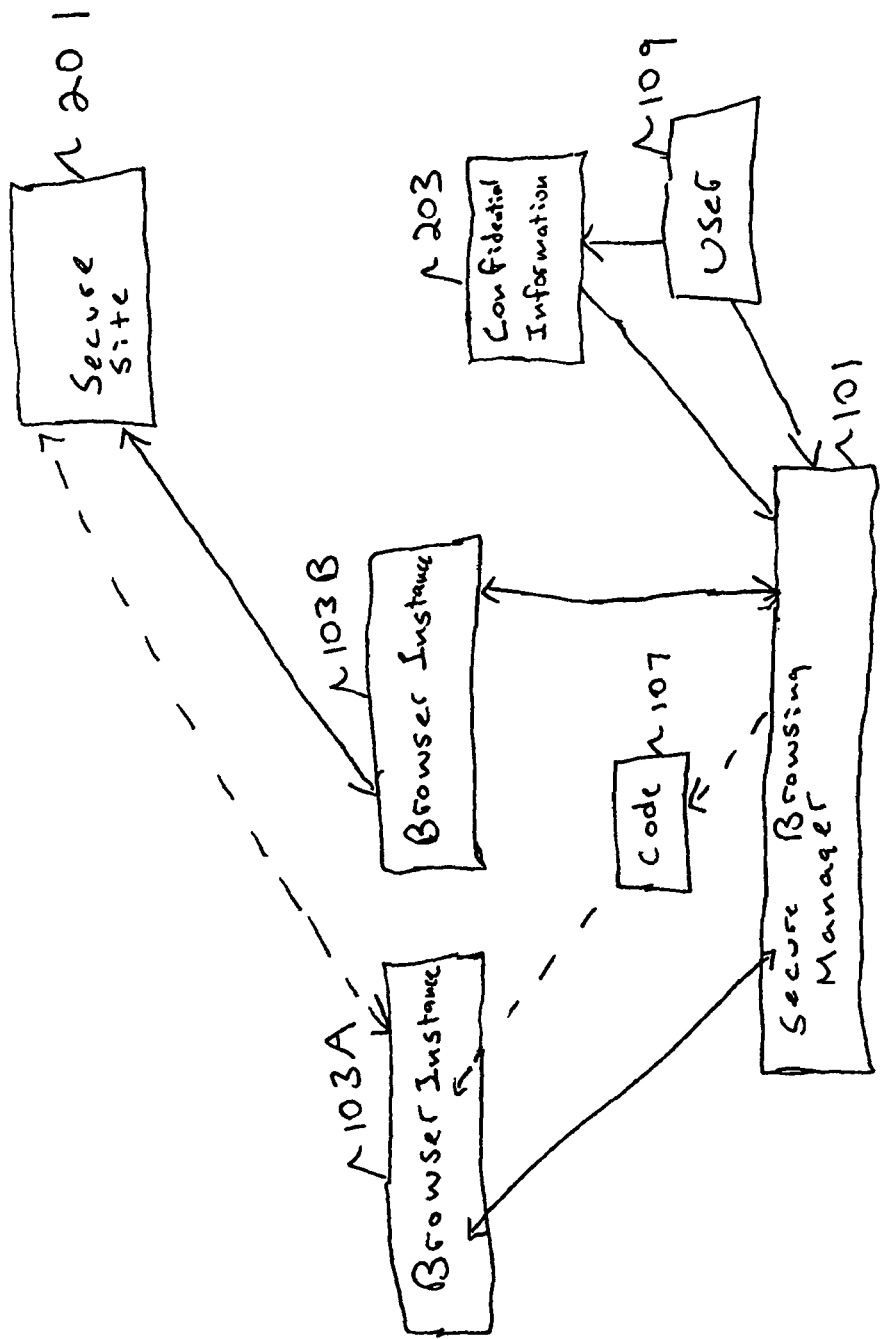
FIG. 2 is a block diagram illustrating a secure browsing manager processing attempts to loaded un-trusted code into a browser, according to some embodiments of the present invention.

On the other hand, if the secure browsing manager 101 determines that the code 107 is not trusted, various actions are possible in various embodiments of the present invention, as illustrated in FIG. 2.

Turning to FIG. 2, in the simplest scenario, if the secure browsing manager 101 determines that the code 107 is not trusted, it blocks the attempt to load the code 107 into the browser 103, thereby keeping the browser 103 secure. In other embodiments, the secure browsing manager 101 takes other actions, for example allowing the code 107 to be loaded into the browser 103, but blocking certain user 109 initiated activity, such as attempts to access secure sites 201, or attempts to enter confidential information 203. In another embodiment, the secure browsing manager 101 allows the code 107 to be loaded, but monitors the subsequent browser 103 activity, and under certain circumstances, such as detecting that the browser 103 is attempting to access a secure site 201, terminates the browser 103A instance, and creates a secure browser instance 103B without any loaded un-trusted code 107. The secure browser instance 103B then carries out the transaction(s) in question.

Figure 3:
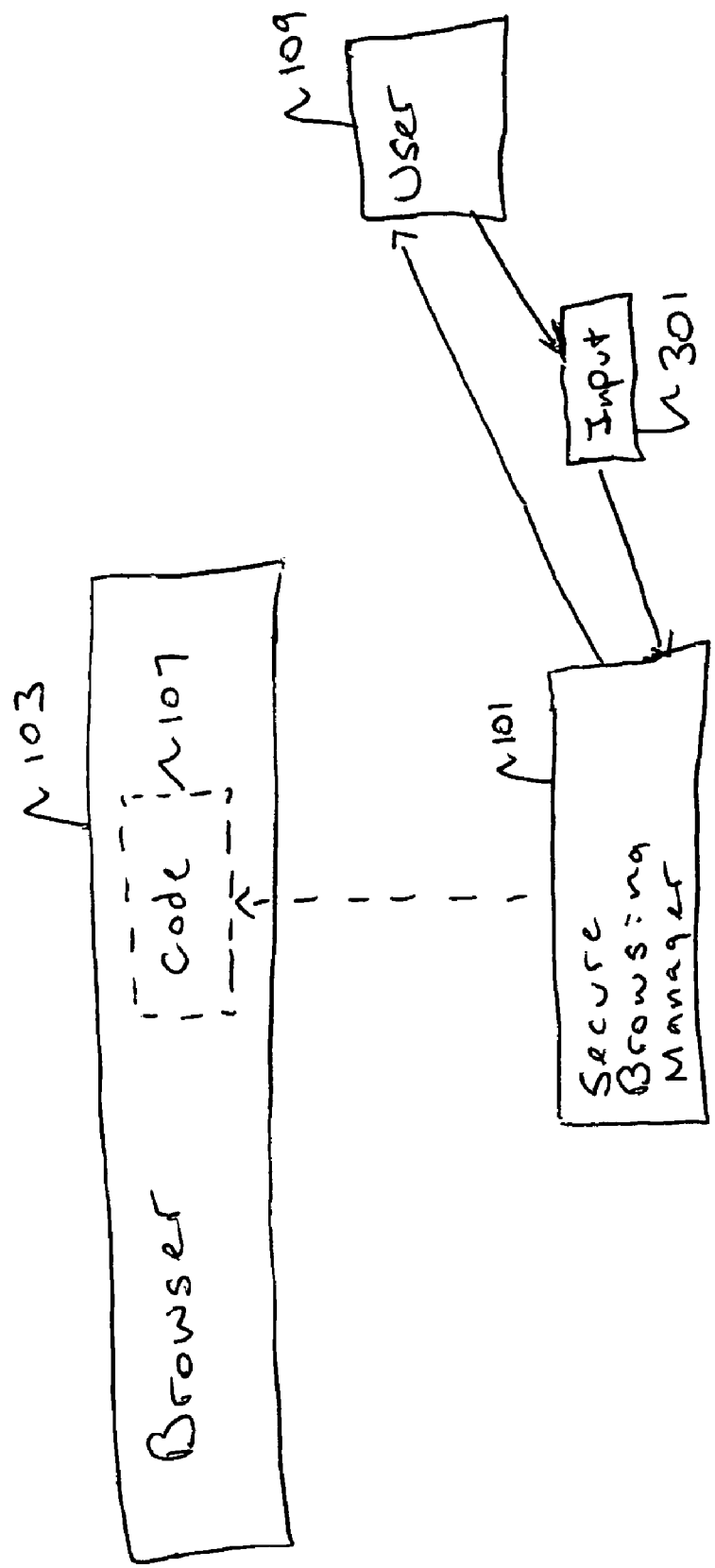
FIG. 3 is a block diagram illustrating a secure browsing manager communicating with a user concerning attempts to load un-trusted code into a browser, according to some embodiments of the present invention.

FIG. 3 illustrates embodiments of the present invention in which the secure browsing manager 101 alerts the user 109 of detected attempts to load un-trusted code 107 into the browser 103, and processes such attempts according to input 301 received from the user 109. For example, the user 109 can indicate not to load the code 107 into the browser 103, in which case the secure browsing manager 101 blocks the attempt to load the code 107. On the other hand, responsive to receiving input 301 from the user 109 directing the secure browsing manager 101 to load the un-trusted code 107, the secure browsing manager 101 allows the code 107 to be loaded into the browser 103. Of course, more complicated user 109 directives are also possible (e.g., allow the code 107 to be loaded but monitor the browser activity, etc.).

Figure 4:
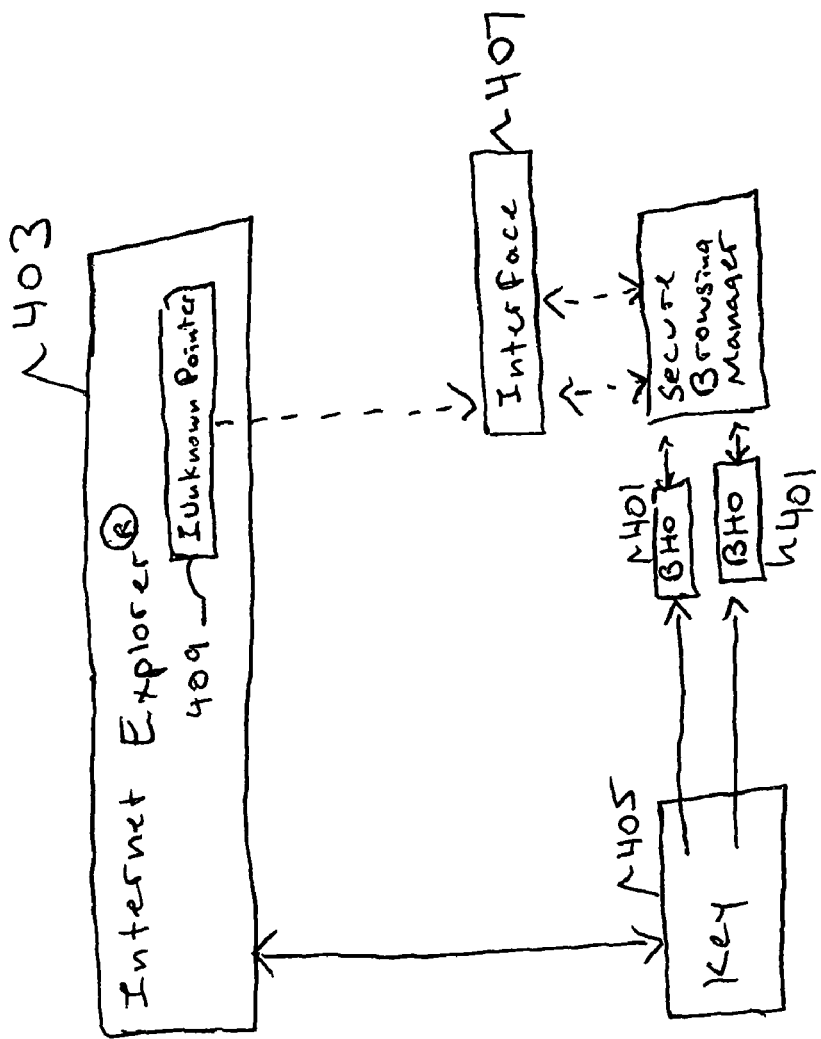
FIG. 4 is a block diagram illustrating a secure browsing manager providing a secure browser in embodiments of the present invention in which Browser Helper Objects can be loaded into Internet Explorer.

Turning now to FIG. 4, an example embodiment of the present invention is illustrated in greater detail. The embodiment illustrated in FIG. 4 is one in which the code 107 loaded into browsers 103 is in the form of Browser Helper Objects (BHOs) 401 loaded into Internet Explorer 403. In its simplest form, a BHO 401 is a .COM in-process server registered under a certain registry key 405. Upon startup, Internet Explorer 403 looks up that key 405 and loads all the objects 401 whose class ID (CLSID) is stored there. Explorer 403 initializes the object 401 and asks it for a certain .COM interface 407. If that interface 407 is found, Explorer 403 uses the methods provided to pass its IUnknown pointer 409 down to the object 401. Once a BHO 401 is loaded, it has complete access to the browser 103 content. In the embodiment illustrated in FIG. 4, the secure browsing manager 101 detects attempts to load BHOs 401 into Internet Explorer 403, determines whether the BHOs 401 are trusted, and processes the attempts accordingly.

As will be understood by those familiar with the art, the invention may be embodied in other specific forms without departing from the spirit or essential characteristics thereof. Likewise, the particular naming and division of the modules, agents, managers, functions, layers, features, attributes, methodologies and other aspects are not mandatory or significant, and the mechanisms that implement the invention or its features may have different names, divisions and/or formats. Furthermore, as will be apparent to one of ordinary skill in the relevant art, the modules, agents, managers, functions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

What is claimed is:

1. A computer implemented method for securing a browser, the method comprising the steps of:
   intercepting load calls;
   determining that an intercepted load call is attempting to load code into the browser;
   determining whether the code is trusted; and
   responsive to determining that the code is not trusted:
      allowing the code to be loaded into the browser;
      monitoring activity of the browser having the loaded untrusted code; and
      responsive to the monitoring detecting that the browser having the loaded untrusted code is attempting to access a secure site:
         blocking the attempt to access the secure site with the browser having the loaded untrusted code;
         creating a secure browser instance without any loaded untrusted code; and
         allowing the secure browser instance to access the secure site.

2. The method of claim 1 further comprising:
   responsive to determining the code is not trusted, alerting a user that a process is attempting to load untrusted code into the browser.

3. The method of claim 2 further comprising:
   allowing the code to be loaded into the browser responsive to input from the user.

4. The method of claim 1 further comprising:
   blocking user initiated activity attempting to access the secure site or enter confidential information using the browser responsive to determining that the code is not trusted.

5. The method of claim 1 wherein the code is of a type from a group of code types consisting of:
   browser helper objects;
   dynamic link libraries;
   Active-X controls;
   Java applets;
   global Windows hooks; and
   toolbars.

6. The method of claim 1 wherein determining whether the code is trusted is a function of at least one criteria from a group of criterion consisting of:
   whether the code is known;
   user context;
   system environment; and
   user environment.

7. A computer readable storage medium containing an executable computer program product for securing a browser, the computer program product comprising:
   program code for intercepting load calls;
   program code for determining that an intercepted load call is attempting to load code into the browser;
   program code for determining whether the code is trusted; and program code for, responsive to determining that the code is not trusted:
- allowing the code to be loaded into the browser;
- monitoring activity of the browser having the loaded untrusted code; and
- responsive to the monitoring detecting that the browser having the loaded untrusted code is attempting to access a secure site:
  - blocking the attempt to access the secure site with the browser having the loaded untrusted code;
  - creating a secure browser instance without any loaded untrusted code; and
  - allowing the secure browser instance to access the secure site.

8. The computer program product of claim 7 further comprising:
program code for blocking user initiated activity attempting to access the secure site or enter confidential information using the browser responsive to determining that the code is not trusted.

9. A computer system for securing a browser, the computer system comprising:
a computer readable storage medium storing executable software portions comprising:
- a software portion configured to intercept load calls;
- a software portion configured to determine that an intercepted load call is attempting to load code into the browser;
- a software portion configured to determine whether the code is trusted; and
- a software portion configured to, responsive to determining that the code is not trusted:
  - allow the code to be loaded into the browser;
  - monitor activity of the browser having the loaded untrusted code; and
  - responsive to the monitoring detecting that the browser having the loaded untrusted code is attempting to access a secure site:
    - block the attempt to access the secure site with the browser having the loaded untrusted code;
    - create a secure browser instance without any loaded untrusted code; and
    - allow the secure browser instance to access the secure site.

10. The computer system of claim 9 wherein the software portions further comprise:
a software portion configured to block user initiated activity attempting to access a secure site or enter confidential information using the browser responsive to determining that the code is not trusted.

11. The method of claim 1, further comprising:
monitoring browser activity responsive to allowing the code to be loaded into the browser, the monitoring detecting that the browser is attempting to access a secure site.

12. The method of claim 1 further comprising terminating the browser having the loaded untrusted code responsive to determining that the code is not trusted and the monitoring detecting that the browser is attempting to access a secure site.

* * * * *